United States Patent [19]

Quick et al.

[11] Patent Number: 4,634,405
[45] Date of Patent: * Jan. 6, 1987

[54] PULLEY CONSTRUCTION AND METHOD OF MAKING THE SAME

[75] Inventors: Terrence R. Quick, Springfield; Joseph P. Miranti, Jr., Porter Township, Christian County; Randy C. Foster, Springfield, all of Mo.

[73] Assignee: Dayco Corporation, Dayton, Ohio

[*] Notice: The portion of the term of this patent subsequent to Jan. 29, 2002 has been disclaimed.

[21] Appl. No.: 655,774

[22] Filed: Oct. 1, 1984

Related U.S. Application Data

[62] Division of Ser. No. 449,046, Dec. 13, 1982, Pat. No. 4,496,335.

[51] Int. Cl.⁴ .............................................. F16H 11/06
[52] U.S. Cl. ........................................ 474/13; 474/11; 474/28; 474/15; 29/159 R
[58] Field of Search ................. 29/159 R; 474/13, 15, 474/11, 28, 43, 46

[56] References Cited

U.S. PATENT DOCUMENTS

| | | | |
|---|---|---|---|
| 2,810,296 | 10/1957 | Long | 474/28 |
| 4,056,015 | 11/1977 | Ludolph et al. | 474/28 |
| 4,102,214 | 7/1978 | Hoff | 474/12 |
| 4,348,197 | 9/1982 | Oliver | 474/28 |

Primary Examiner—James A. Leppink
Assistant Examiner—Frank H. McKenzie, Jr.
Attorney, Agent, or Firm—Joseph V. Tassone

[57] ABSTRACT

A pulley construction and method of making the same are provided, the pulley construction having a pair of opposed flanges respectively provided with surfaces for engagement with a V-belt construction when the V-belt construction is disposed therebetween. The pulley construction has structure for moving one of the flanges axially relative to the other of the flanges and has a fluid dampening unit operatively associated with the one flange to dampen the axial movement of that one flange relative to the other flange with a restrictive force, the dampening unit comprising a flexible bladder having a part thereof operatively interconnected to that one flange.

11 Claims, 8 Drawing Figures

PULLEY CONSTRUCTION AND METHOD OF MAKING THE SAME

This is a division of Application Ser. No. 449,046, filed Dec. 13, 1982, now U.S. Pat. No. 4,496,335, issued Jan. 29, 1985.

BACKGROUND OF THE INVENTION

1. Field of the Invention

This invention relates to an improved pulley construction and to a method of making such a pulley construction or the like.

2. Prior Art Statement

It is known to provide a pulley construction having a pair of opposed flanges respectively provided with surface means for engagement with a V-belt construction when the V-belt construction is disposed therebetween, the pulley construction having means for moving one of the flanges axially relative to the other of the flanges and having fluid dampening means operatively associated with that one flange to dampen the axial movement of the one flange relative to the other flange with a restrictive force. For example, see the U.S. Patent to Oliver, U.S. Pat. No. 4,348,197 and the British Patent to Croft, No. 666,942 wherein the fluid dampening means thereof each comprises a piston and cylinder arrangement.

It is also known to provide a speed responsive pulley construction wherein the means for axially moving the one flange of the pulley construction relative to the other flange thereof comprises a plurality of elements that respectively act in raceway means of the one flange and against a cooperating non-axially movable member of the pulley construction. For example, see the U.S. Patent to Hoff, U.S. Pat. No. 4,102,214.

It is also known to provide a pneumatically operated flexible bladder-like member for moving the axially movable flange of a pulley construction relative to the fixed flange thereof. For example, see the U.S. Patent to Long, U.S. Pat. No. 2,810,296.

SUMMARY OF THE INVENTION

It is one feature of this invention to provide an improved pulley construction that has fluid dampening means for dampening the axially movement of one flange of the pulley construction relative to the other flange thereof with a restrictive force.

In particular, it is well known that in a variable speed transmission which is driven by a V-belt construction or the like, it is desirable to achieve a smooth consistent movement while shifting to decrease wear on the belt construction and the sheaves or pulley constructions. This is particularly a problem in a high ratio or a high load drive, such as a continuously variable transmission for a vehicle, etc.

Thus, it was found according to the teachings of this invention that vibrations and shock load motion could be dampened by air and that the air could be contained between a flexible bladder and a housing of the pulley construction to be forced out or drawn in through orifice means formed in the housing whereby such restricted air flow through the orifice means would cushion the movement of the movable flange relative to the fixed flange in both directions thereof.

For example, one embodiment of this invention provides a pulley construction having a pair of opposed flanges respectively provided with surface means for engagement with a V-belt construction when the V-belt construction is disposed therebetween, the pulley construction having means for moving one of the flanges axially relative to the other flanges and having fluid dampening means operatively associated with the one flange to dampen the axial movement of the one flange relative to the other flange with a restrictive force. The dampening means comprises a flexible bladder having a part thereof operatively interconnected to the one flange.

Accordingly, it is an object of this invention to provide an improved pulley construction having one or more of the novel features of this invention as set forth above or hereinafter shown or described.

Another object of this invention is to provide an improved method of making such a pulley construction, the method of this invention having one or more of the novel features of this invention as set forth above or hereinafter shown or described.

Another object of this invention is to provide an improved combination of a V-belt construction and the pulley construction of this invention, the improved combination of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
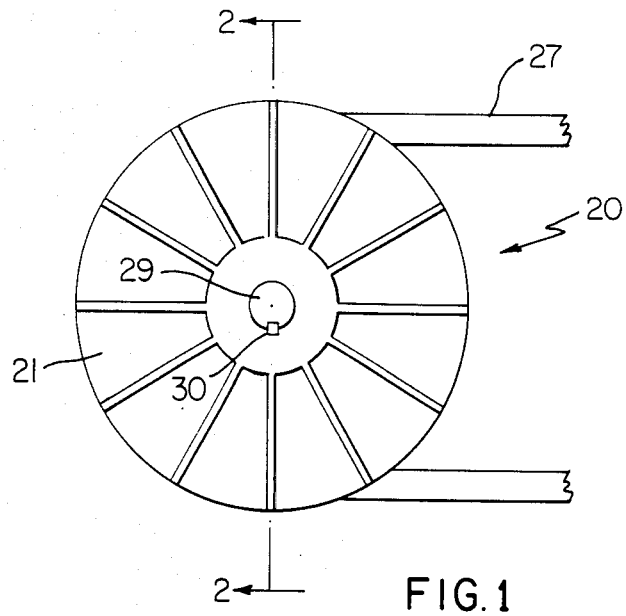
FIG. 1 is a fragmentary side view of the improved pulley construction of this invention being utilized in combination with a V-belt construction.

While the various features of this invention are hereinafter illustrated and described as providing a pulley construction for continuously variable transmission purposes and the like, it is to be understood that the various features of this invention can be utilized singly or in any combination thereof to provide a pulley construction for other belt systems as desired.

Therefore, this invention is not to be limited to only the embodiments illustrated in the drawings, because the drawings are merely utilized to illustrate one of the wide variety of uses of this invention.

Figure 2:
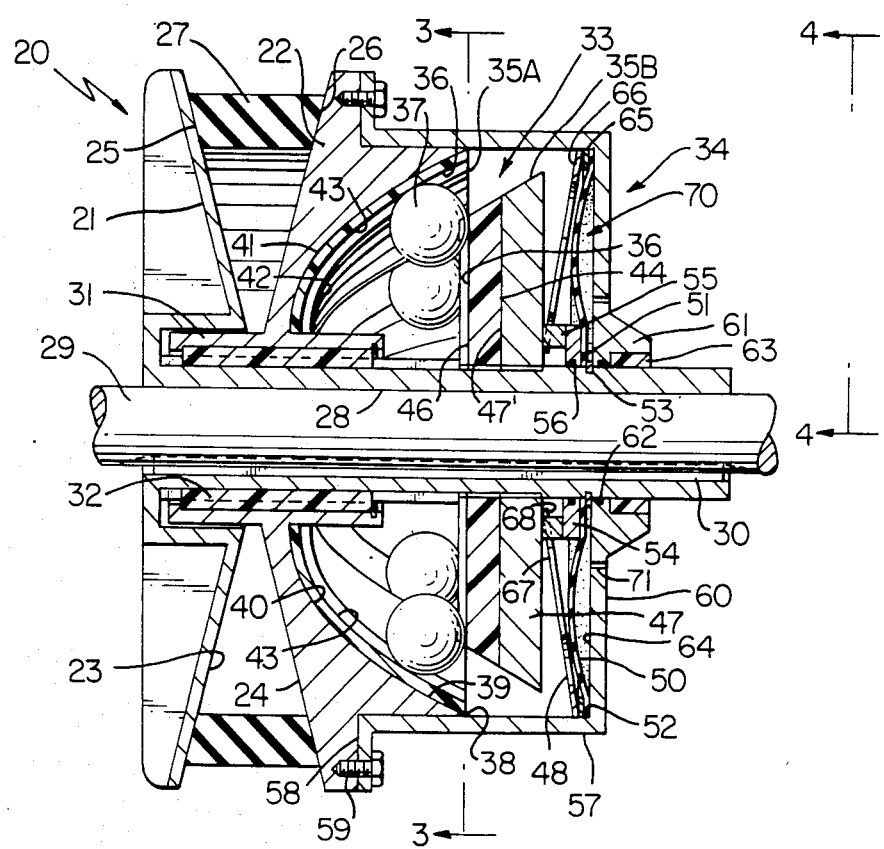
FIG. 2 is an enlarged fragmentary cross-sectional view taken on line 2—2 of FIG. 1.
Figure 3:
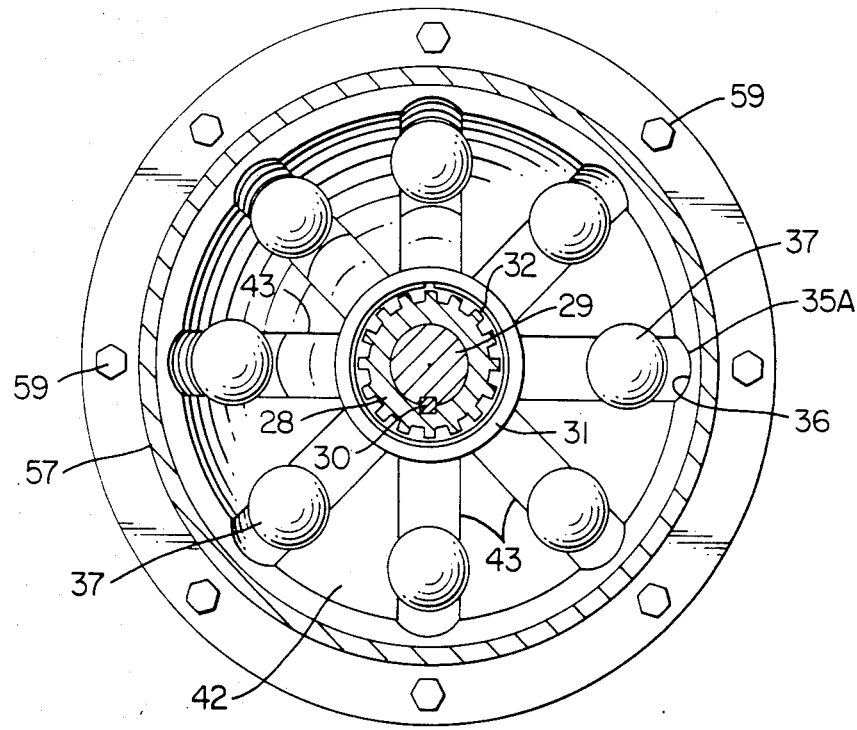
FIG. 3 is a cross-sectional view taken on line 3—3 of FIG. 2.

Referring now to FIGS. 1 and 2, the improved pulley construction of this invention is generally indicated by the reference numeral 20 and comprises a pair of op-

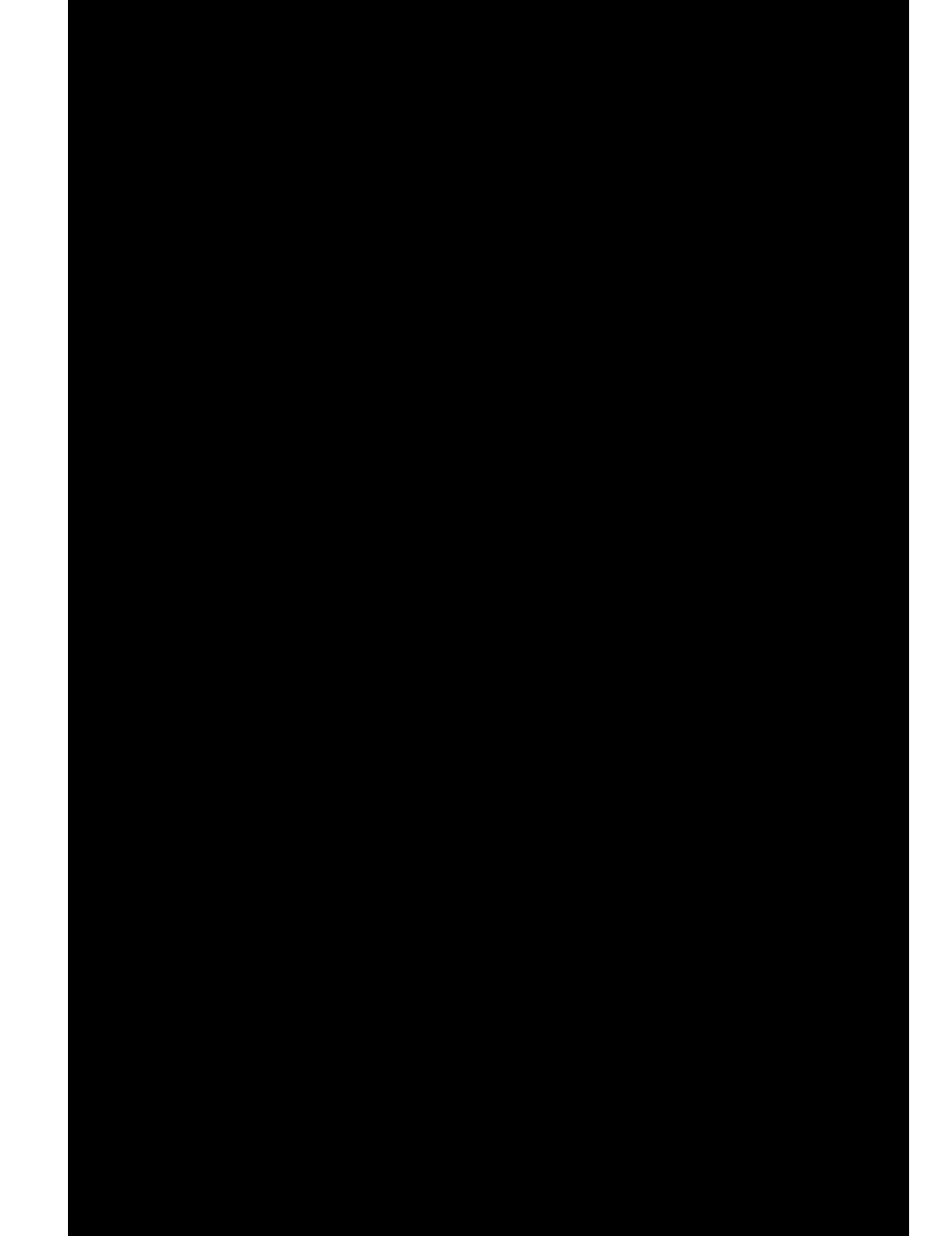

flange 22 is in its most axially spaced position from the flange 21 whereby the V-belt construction 27 is operating with its narrowest diameter about the pulley construction 20.

However, as the speed of rotation of the pulley construction 20 increases, the steel balls 37 are thrown outwardly by a greater centrifugal force and thereby move outward in the tracks 43 and 46 of the raceway means 35A and 35B in the manner illustrated in FIG. 2 to cause the flange 22 to be axially moved toward the flange 21 and thereby cause the V-belt construction 27 to ride outwardly on the surfaces 23 and 24 until the same provides the maxaimum diameter for the V-belt construction 27 in the pulley construction as illustrated in FIG. 2, such movement of the flange 22 toward the flange 21 being in opposition to the force of a spring 48 in a manner hereinafter set forth.

Conversely, as the speed of rotation of the pulley construction 20 decreases so that the balls 37 are not being thrown radially outwardly with as great a centrifugal force as before, the force of the spring 48 moves the flange 22 away from the flange 21 and causes the balls 37 to move radially inwardly in the tracks 43 and 46 to permit the flange 22 to so move away from the flange 21 whereby it can be seen that the spacing of the flange 22 relative to the flange 21 is in relation to the speed of rotation of the pulley construction 20.

As previously stated, it is one feature of this invention to provide the fluid dampening means 34 for dampening the axial movement of the flange 22 relative to the flange 21 as the flange 22 is being moved either toward or away from the flange 21 by the speed responsive means 33 so as to dampen vibrations and shock load motion of the pulley construction 20.

Accordingly, the details of the fluid dampening means 34 will now be described.

The fluid dampening means 34 comprises a flexible bladder 50 that is formed of polymeric material, such as rubber, and is substantially like a flexible diaphragm, the bladder 50 having an inner periphery 51 and an outer periphery 52. The inner periphery 51 of the bladder 50 is held against a C-ring 53 carried by the hub 28 by a disc-like member 54 that has a plurality of extensions 55 disposed in a circular array and abutting the plate 47. The disc 54 carries an annular seal member 56 with seals against the hub 28 for a purpose hereinafter set forth.

The fluid dampening means 34 includes a cup-shaped housing member 57 having its open end 58 secured to the axially movable flange 22 in any suitable manner, such as by the fastening members 59 as illustrated. The cup-shaped member 57 has its closed end 60 provided with an inner peripheral or hub portion 61 telescopically disposed on the hub 28 and carrying an annular seal means 62 as well as a sliding seal means 63 so that while the cup-shaped housing member 57 will rotate in unison with the hub 28, the cup-shaped housing member is axially movable relative thereto as the housing member 57 is carried by the axially movable flange 22. In this manner, the housing member 57 is sealed to the hub 28 by the seal means 62 for a purpose hereinafter described.

Figure 6:
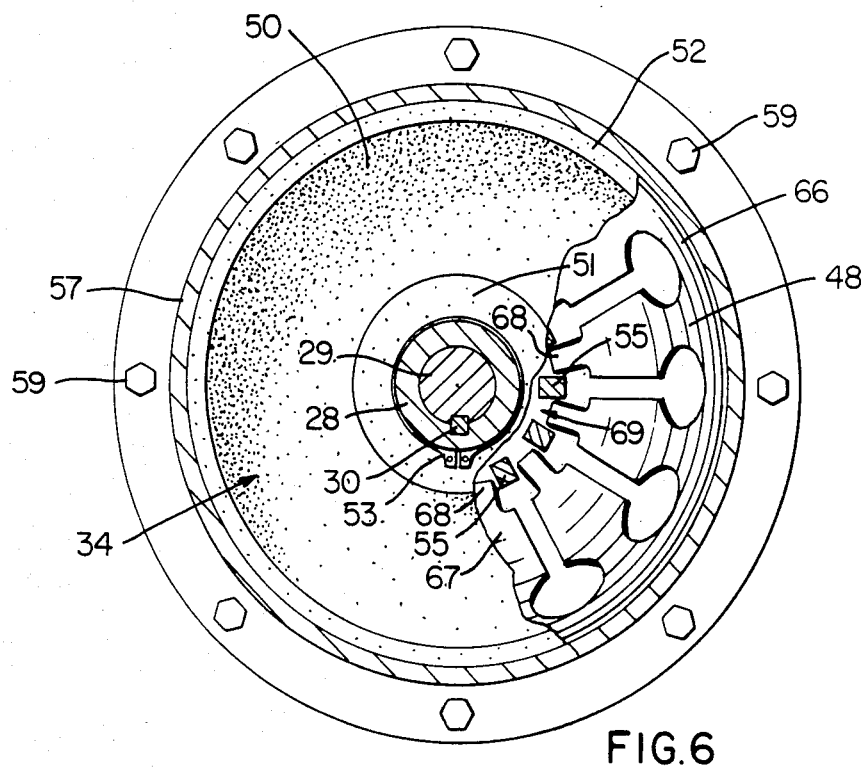
FIG. 6 is a cross-sectional view, partially broken away, and is taken on line 6—6 of FIG. 5.
Figure 7:
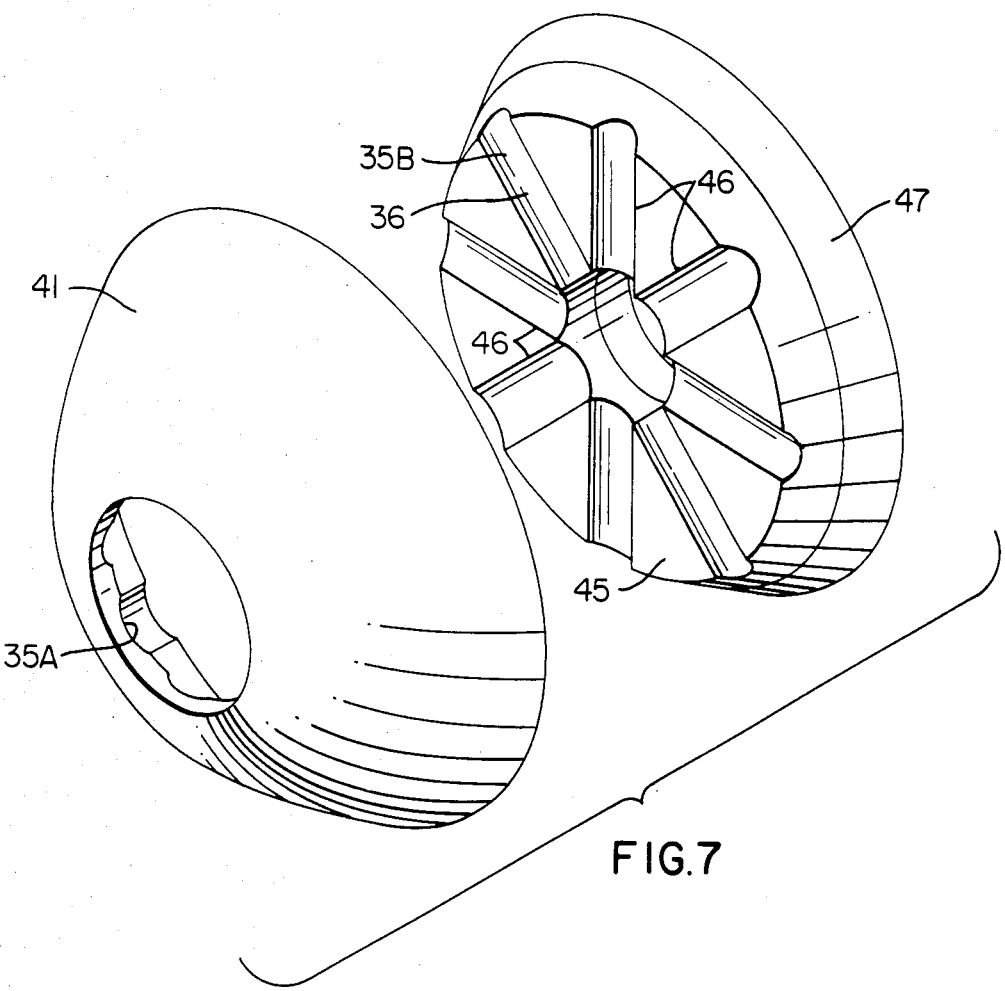
FIG. 7 is an exploded perspective view of the raceway members of the pulley construction of FIGS. 1-6.
Figure 8:
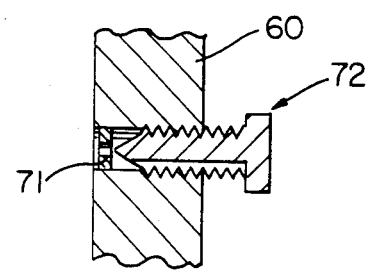
FIG. 8 is an enlarged fragmentary cross-sectional view illustrating another pulley construction of this invention.

The outer peripheral portion 52 of the flexible bladder 50 is held against the inside surface 64 of the closed end wall 60 of the housing member 57 by a retainer ring 65 urged against the outer periphery 52 of the flexible bladder 50 by the outer end 66 of the bladder spring 48 which has its inner end 67 provided with a plurality of fingers 68 that extent through the spaces 69 between the extensions 55 of the plate member 54 as illustrated in FIG. 6.

In this manner, the force of the bladder spring 48 maintains the outer peripheral portion 52 of the diaphagm or bladder 50 in sealing engagement against the end wall surface 64 of the housing member 57 so that the bladder 50 cooperates with the surface 64 of the housing member 57 to define a fluid chamber 70 therebetween, the inner portion of the chamber 70 being closed by the hub 28 between the seal members 56 and 62 carried respectively by the plate 54 and housing means 57 as illustrated.

In this manner, the volume of the chamber 70 varies as the axial position of the flange 22 relative to the fixed flange 21 varies as illustrated respectively in FIGS. 2 and 5 for a purpose hereinafter set forth.

Figure 4:
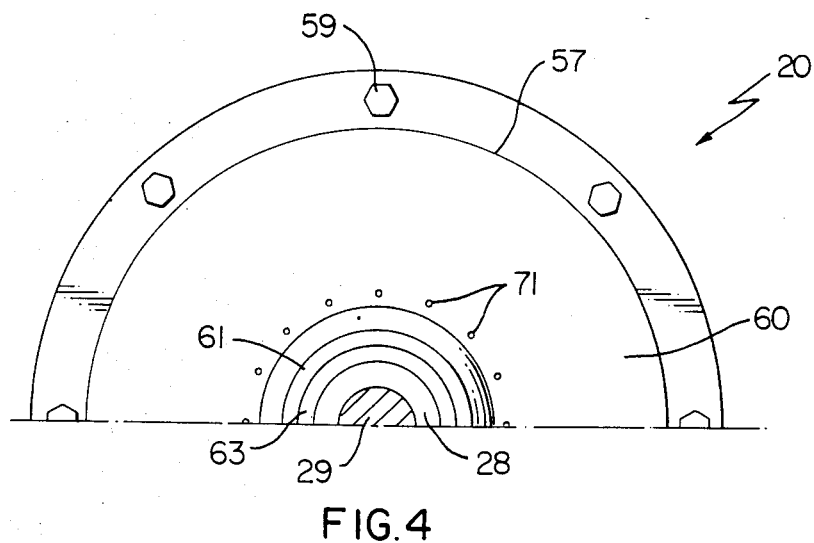
FIG. 4 is a rear view of the pulley construction illustrated in FIG. 2 and is taken in the direction of the arrows 4—4 of FIG. 2.

The chamber 70 of the fluid dampening means 34 is interconnected to the exterior of the pulley construction 20 by a plurality of orifices 71 formed through the end wall 60 of the housing means 57 and being disposed in the circular array as illustrated in FIG. 4, the orifices 71 being restrictive in size so that as the volume of the chamber 70 changes, either air is being forced from the chamber 70 out through the orifices 71 as the volume decreases or is being drawn from the exterior of the pulley construction 20 through the orifices 71 as the volume increases, such changes are restricted by the amount of air flow through the orifices 71. Such increase or decrease in the volume of the chamber 70 depends upon the direction of the axial movement of the flange 22 relative to the fixed flange 21 as will be apparent hereinafter.

Therefore, it can be seen that while the fluid dampening means 34 of this invention utilizes air as the fluid thereof, it is to be understood that the fluid dampening means 34 of this invention can utilize another fluid, such as a liquid, as long as the system is well sealed and fluid flow is contained in a closed system.

In any event, it can be seen that it is a relatively simple method of this invention to make the pulley construction 20 of this invention which is adapted to operate in a manner now to be described.

When the pulley construction 20 of this invention has the V-belt construction 27 disposed in engagement with the surfaces 23 and 24 of the flanges 21 and 22 by being disposed therebetween as illustrated in FIGS. 1 and 2, the pulley construction 20 is adapted to be driven or rotated by the V-belt construction 27 or be driven or rotated by the shaft 29 so as to drive the V-belt construction 27 in a manner well known in the art.

Figure 5:
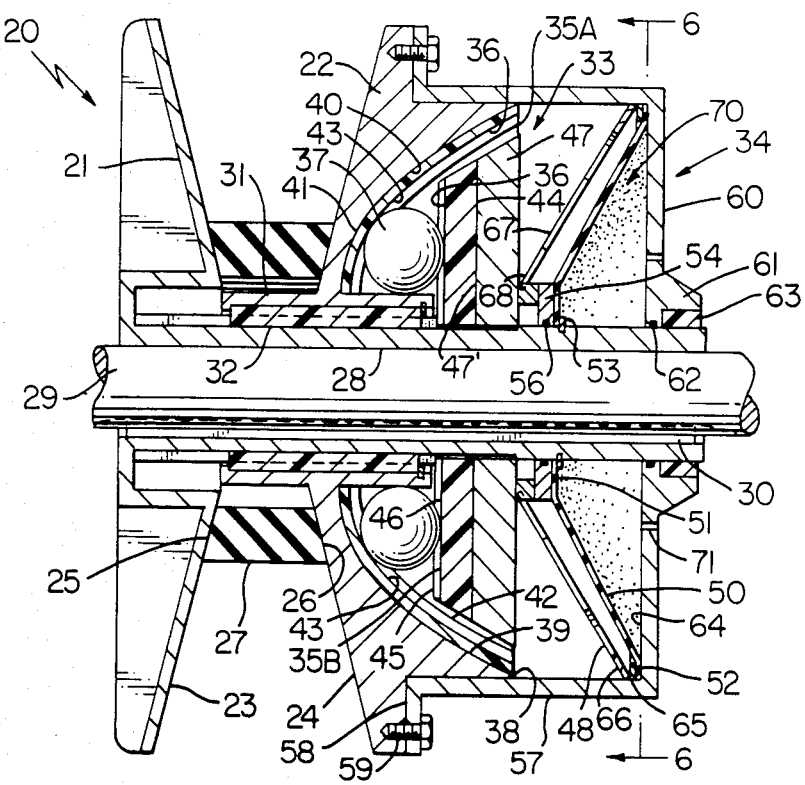
FIG. 5 is a view similar to FIG. 2 and illustrates the pulley construction in another operating condition thereof.

In any event, as the pulley construction 20 is rotating, the speed of rotation thereof causes the balls 37 to be thrown radially outwardly by a centrifugal force and when the force of the balls 37 tending to move outwardly in the tracks 43 and 46 of the polymeric raceway means 35A and 35B is sufficient to overcome the force of the bladder spring 48 tending to maintain the housing 57 and, thus, the flange 22 in its furthest axial position from the flange 21 as illustrated in FIG. 5, the balls 37 force against the arcuate surface of the tracks 43 of the raceway means 35A to axially move the flange 22 toward the flange 21 and force the belt 27 outwardly to a larger diameter position thereof in the pulley construction 20 in the manner illustrated in FIG. 2. Such axial movement of the flange 22 toward the flange 21 continues as the speed of rotation of the pulley 20 increases until the balls 37 reach the position illustrated in FIG. 2 at which time the housing means 27 is disposed

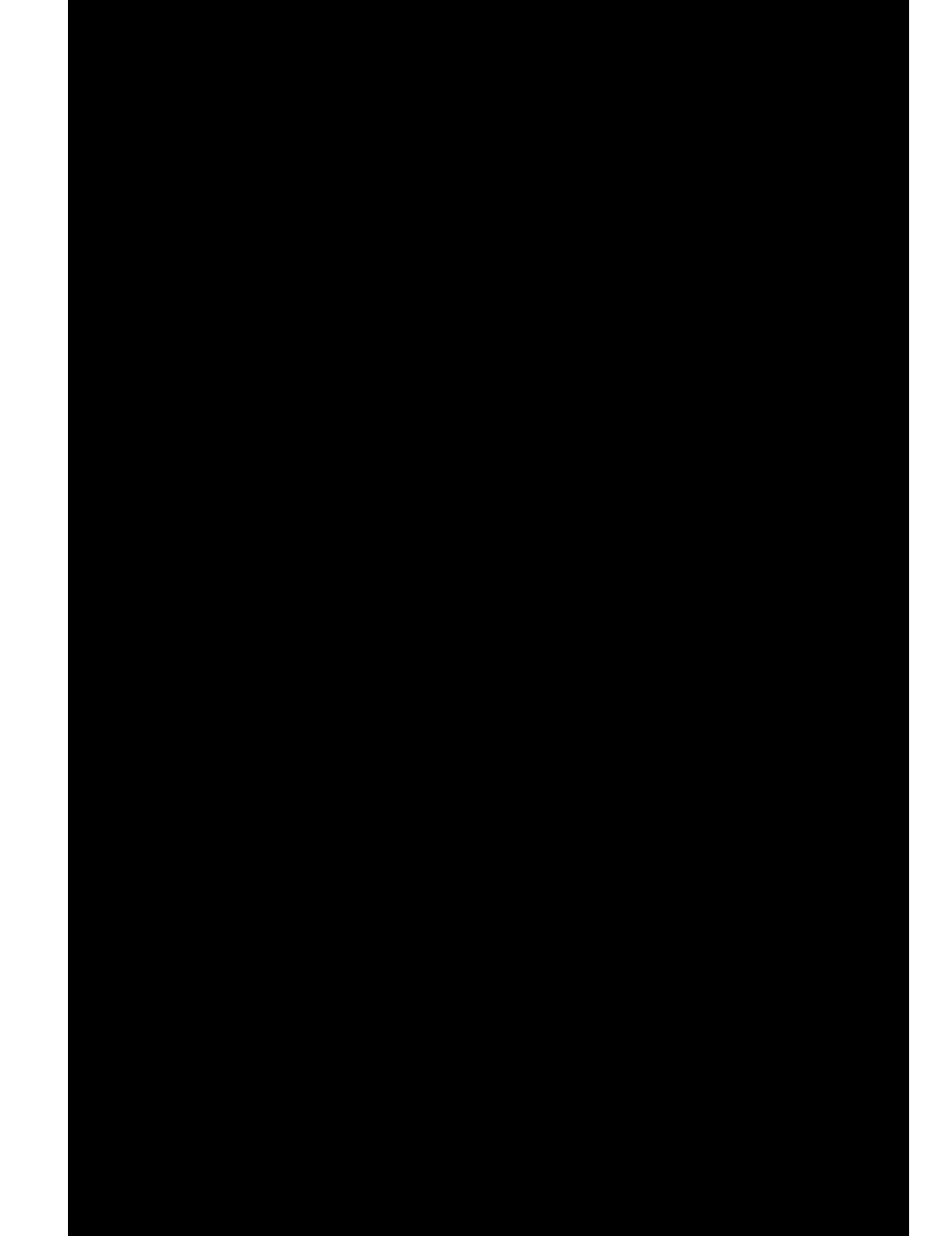

bladder to comprise a flexible diaphragm-like member having an inner peripheral means and an outer peripheral means, and forming said one part of said bladder to comprise said outer peripheral means and said other part of said bladder to comprise said inner peripheral means.

10. In the combination of a V-belt construction and a pulley construction having a pair of opposed flanges respectively provided with surface means engaging against said V-belt construction that is disposed therebetween, said pulley construction having means for moving one of said flanges axially relative to the other of said flanges, said pulley construction having fluid dampening means operatively associated with said one flange to dampen said axial movement of said one flange relative to said other flange with a restrictive force, the improvement wherein said dampening means comprises a flexible bladder having a part thereof operatively interconnected to said one flange.

11. A combination as set forth in claim 10 wherein said means for moving said one flange of said pulley construction comprises speed responsive means.

* * * * *